US011268560B2

(12) United States Patent
DiChiara

(10) Patent No.: US 11,268,560 B2
(45) Date of Patent: Mar. 8, 2022

(54) METHOD OF MAKING WHISKER REINFORCED HIGH FRACTURE TOUGHNESS CERAMIC THREADED FASTENERS

(71) Applicant: The Boeing Company, Chicago, IL (US)

(72) Inventor: Robert A. DiChiara, Carlsbad, CA (US)

(73) Assignee: The Boeing Company, Chicago, IL (US)

( * ) Notice: Subject to any disclaimer, the term of this patent is extended or adjusted under 35 U.S.C. 154(b) by 800 days.

(21) Appl. No.: 15/910,381

(22) Filed: Mar. 2, 2018

(65) Prior Publication Data

US 2018/0187710 A1 Jul. 5, 2018

Related U.S. Application Data

(62) Division of application No. 14/918,846, filed on Oct. 21, 2015.

(51) Int. Cl.

| | |
|---|---|
| *C04B 35/117* | (2006.01) |
| *F16B 33/00* | (2006.01) |
| *C04B 35/593* | (2006.01) |
| *C04B 35/645* | (2006.01) |
| *B28B 3/02* | (2006.01) |
| *B28B 7/00* | (2006.01) |

(Continued)

(52) U.S. Cl.
CPC ............ *F16B 33/006* (2013.01); *B28B 3/025* (2013.01); *B28B 7/0064* (2013.01); *B28B 7/18* (2013.01); *C04B 35/117* (2013.01); *C04B 35/593* (2013.01); *C04B 35/645* (2013.01); *C04B 35/80* (2013.01); *F16B 37/00* (2013.01); *C04B 2235/3826* (2013.01); *C04B 2235/5276* (2013.01)

(58) Field of Classification Search
CPC ..... B28B 3/025; C04B 35/117; C04B 35/593; C04B 35/645; C04B 35/80; C04B 35/10; C04B 35/584; C04B 2235/3826; C04B 2235/5276; F16B 35/00
See application file for complete search history.

(56) References Cited

U.S. PATENT DOCUMENTS

| | | | |
|---|---|---|---|
| 3,424,212 A | | 1/1969 | Kemper |
| 3,495,494 A | * | 2/1970 | Scott ..................... B29C 43/021 411/411 |

(Continued)

FOREIGN PATENT DOCUMENTS

| | | |
|---|---|---|
| EP | 0334577 | 9/1989 |
| EP | 3103727 | 12/2016 |

(Continued)

OTHER PUBLICATIONS

Office Action dated Jun. 1, 2020 in co-pending Chinese Patent Application No. 2016108661266.

(Continued)

*Primary Examiner* — Noah S Wiese
(74) *Attorney, Agent, or Firm* — Quinn IP Law

(57) ABSTRACT

A high temperature fastener including a bolt and a nut, where the bolt and the nut are constructed of an aluminum oxide ceramic material reinforced with silicon-carbide crystal whiskers or silicon nitride.

20 Claims, 5 Drawing Sheets

(51) Int. Cl.
  *B28B 7/18* (2006.01)
  *C04B 35/80* (2006.01)
  *F16B 37/00* (2006.01)

(56) References Cited

U.S. PATENT DOCUMENTS

| | | | | |
|---|---|---|---|---|
| 4,543,345 | A | * 9/1985 | Wei | C04B 35/563 |
| | | | | 264/125 |
| 4,746,635 | A | 5/1988 | Inoue et al. | |
| 4,975,014 | A | 12/1990 | Rufin | |
| 5,246,894 | A | 9/1993 | Okuda | |
| 5,405,227 | A | * 4/1995 | His | C04B 35/584 |
| | | | | 411/366.3 |
| 5,564,874 | A | 10/1996 | Agatonovic | |
| 5,728,445 | A | * 3/1998 | Murakami | F16B 33/006 |
| | | | | 428/113 |
| 7,037,065 | B2 | * 5/2006 | Reigl | F01D 25/243 |
| | | | | 415/47 |
| 9,869,337 | B2 | * 1/2018 | Drexler | F16B 33/006 |
| 2002/0064615 | A1 | 5/2002 | Wildenrotter et al. | |
| 2010/0189529 | A1 | 7/2010 | Steffier | |
| 2013/0228105 | A1 | 9/2013 | Yamamura | |
| 2017/0114819 | A1 | 4/2017 | DiChiara | |
| 2018/0187710 | A1 | 7/2018 | DiChiara | |

FOREIGN PATENT DOCUMENTS

| | | |
|---|---|---|
| EP | 3159321 | 4/2017 |
| EP | 3549924 | 10/2019 |
| JP | 58-169211 | 11/1983 |
| JP | S59190510 | 10/1984 |
| JP | 61-270266 | 11/1986 |
| JP | 6-81826 | 3/1994 |
| JP | H08109914 A | 4/1996 |
| JP | 2003-95761 | 4/2003 |
| JP | 2005-9545 | 1/2005 |
| JP | 2005140325 | 6/2005 |
| JP | 2007-321851 | 12/2007 |
| SU | 388114 | 9/1973 |
| WO | WO 88/06147 | 8/1988 |

OTHER PUBLICATIONS

Office Action dated Jun. 2, 2018 in co-pending EP Patent Application No. 16 194 101.8.
Office Action dated Jul. 7, 2020 in co-pending Canadian Patent Application No. 2,936,949.
Office Action dated Mar. 31, 2021 issued in co-pending JP PT App No. 2016-204375.
European Search Report dated Mar. 6, 2017 in co-pending EP Patent Application No. 16194101.8.
Rujie et al: "Pull-Off Behavior of MAX Phase Ceramic Bolted Connections: Experimental Testing and Simulation Analysis", Advanced Engineering Materials 2015 DOI: 10.1002/adem.201500288 pp. 1-6.
Yuri et al: "Structural Design and High Pressure Test of a Ceramic Combustor for 1500° C. Class Industrial Gas Turbine" Presented at the International Gas Turbine and Aeroengine Congress & Exhibition; Birmingham, UK—Jun. 10-13, 1996.
Böhrk, et al.: "Secure tightening of a CMC fastener for the heat shield of re-entry of vehicles", Composite Structures 92 (2010) 107-112.
Mei et al: "High-temperature tensile properties and oxidation behavior of carbon fiber reinforced silicon carbide bolts in a simulated re-entry environment", Carbon 48 (2010) 3007-3013.
Office Action dated Sep. 5, 2019, issued in co-pending Russian Patent Application No. 2016126493/12.
Office Action dated Sep. 3, 2019, issued in co-pending Chinese Patent Application No. 201610866126.6.
Office Action dated Nov. 17, 2020 issued in co-pending JP PT App No. 2016-204375.
Office Action dated Jan. 31, 2020, issued in co-pending Canadian Patent Application No. 2,936,949.
Bohrk et al, "Secure Tightening of a CMC Fastener for the Heat Shield of Re-entry Vehicles", Composite Structures, 92, pp. 107-112, Jan. 1, 2010.
He et al, "Pull-Off Behavior of MAX Phase Ceramic Bolted Connections: Experimental Testing and Simulation Analysis", Advanced Engineering Materials, 18 No. 4, pp. 591-596, Sep. 3, 2015.
Extended European Search Report dated Aug. 13, 2019, issued in co-pending European Patent Application No. 19177492.6.
Office Action dated Jun. 18, 2019, issued in co-pending Canadian Patent Application No. 2,936,949.
Office Action dated Jul. 10, 2020 in co-pending Australian Patent Application No. 2016204479.
Mei H et al, "High-temperature tensile properties and oxidation behavior of carbon fiber reinforced silicon carbide bolts in a simulated re-entry environment", Carbon, Elsevier, Oxford, GB, vol. 48, No. 11, ISSN 0008-6223, (Sep. 1, 2010), pp. 3007-3013 (Feb. 1, 2010).
Bohrk H et al, "Secure tightening of a CMC fastener for the heat shield of re-entry vehicles", Composite Structures, Elsevier Science Ltd, GB, vol. 92, No. 1, doi: 10.1016/). COMPSTRUCT. 2009-07-002, ISSN 0263-8223 (Jan. 1, 2010), pp. 107-112, (Jul. 7, 2009).
Rujie et al, "Pull-Off Behavior of MAX Phase Ceramic Bolted Connections: Experimental Testing and Simulation Analysis", Advanced Engineering Materials., DE, (Sep. 3, 2015), vol. 18, No. 4, doi: 10.1002/adem.201500288, ISSN 1438-1656, pp. 591-596.
Yuri et al, "Structural Design and High Pressure Test of a Ceramic Combustor for 1500° C. Class Industrial Gas Turbine", vol. 5: Manufacturing Materials and Metallurgy, Ceramics; Structures and Dynamics; Controls, Diagnostics and Instrumentation, Education; General (Jun. 10, 1996). doi: 10.1115/96-GT-346, ISBN 978-0-7918-7876-7.
Office Action in related JP Application No. JP2016-204375 and machine translation.
JPH08109914A machine translation.

\* cited by examiner

METHOD OF MAKING WHISKER REINFORCED HIGH FRACTURE TOUGHNESS CERAMIC THREADED FASTENERS

This application is a divisional application of application Ser. No. 14/918,846, which was filed on Oct. 21, 2015, and is currently pending.

FIELD

This disclosure pertains to a fastener comprised of a bolt and nut where the bolt and nut are constructed of an aluminum oxide ceramic material reinforced with silicon-carbide crystal whiskers.

BACKGROUND

Thermal protection systems (TPS), for example re-entry heat shields for spacecraft, fuselage sections of hypersonic vehicles, jet engine exhaust components, etc. are constructed of materials that need to be heat-resistant and must endure very harsh environments. Reentry vehicle surfaces are particularly difficult. The surface must have low catalycity because the shockwave just in front of the reentry vehicle surface dissociates the air molecules and provides the potential for additional heating. As the air molecules break apart and collided with the surface they recombine in an exothermic reaction. Since the surface acts as a catalyst, it is important that the surface has a low catalycity, this will reduce the propensity to augment the energy from this chemical reaction. These materials must also be resistant to hot oxygen, particularly resistant to atomic oxygen to minimalize scaling of the material surfaces. The materials must have high emissivity to ensure the maximum rejection of incoming convective heat through radiative heat transfer. These requirements are difficult to meet in thermal protection system applications such as tiles, blankets and other similar structures used in the thermal protection systems.

In thermal protection systems that employ tiles, blankets and ceramic matrix composite components, the tiles for example are primarily bonded in place. For many TPS applications, adhesively bonding insulation such as tiles is used to attach insulation to the outer mold lines of vehicles, for example hypersonic vehicles. There is an interest in mechanically attaching tiles, blankets and other forms of ceramic matrix composites for easy, quick replacements, or for maintenance, as well as the limitation in temperature of many adhesives.

However, in applications such as heat shield surfaces of re-entry vehicles, engine exhaust components and in hypersonic vehicle constructions, the use of metal fasteners in attaching ceramic matrix components in these applications has been a problem. Most metals have high catalycity, low thermal emissivity, a high coefficient of thermal expansion and get soft and weaker with increases in temperature. If fasteners are used to attach TPS or exhaust liners to a vehicle, they are usually made of high temperature metal alloys. TPS components or panels if fastened in place, the fasteners are usually buried or covered with an insulated plug to protect the fastener and assure a surface that is low in catalycity and high emissivity and smooth so as not to disturb or trip the boundary layer which would raise the temperature. This protects the metal fastener from the extreme heat of its operational environment, but there are disadvantages in not being able to get to a metal fastener buried in the TPS very easily, or at all. Additionally, most metals have high catalycity, low emissivity, a high coefficient of thermal expansion and do not meet many of the requirements for fasteners used in high temperature environments, no less have a low coefficient of thermal expansion to match ceramic matrix composites. Unlike metal, most ceramics have low catalycity, some have high emissivity and are very hard and wear resistant.

Presently, most turbine engine exhaust components and fasteners are mainly if not all made out of super alloy metals. The components are actively cooled so that the metal can survive the environment. As ceramic matrix composites and other ceramic components get implemented into turbine engine exhaust systems, the metal super alloy fasteners can no longer be used because the metal cannot take the temperature. This is made worse by the ceramic matrix composite having a lower thermal conductivity compared to metal, so even if the panels were cooled, the fasteners would still have a tendency to overheat.

SUMMARY

For the above set forth reasons and others, it would be much better for a fastener used to fasten ceramic matrix composites in a thermal protection system to be constructed of a ceramic material. However, most strong ceramics are monolithic, brittle, notch sensitive, have thermal shock issues and are prone to catastrophic failure, which is not ideal for making fasteners. Because ceramic fasteners are brittle, hard and notch sensitive, machining screw threads on a fastener of ceramic material is also very difficult, especially machining internal screw threads. Creating threaded ceramic fasteners is usually done in processes like injection molding before firing, but these types of threads are rounded and not precise due to firing shrinkage, and the ceramic fastener strength is still typically very low, with high scatter, and are not very predictable.

The high temperature threaded fastener of this disclosure is comprised of a bolt having an external screw threaded surface and a nut having an internal screw threaded surface. Both the bolt and nut are constructed of an aluminum oxide ceramic material reinforced with silicon-carbide crystal whiskers. The high temperature threaded fastener meets the requirement of high strength over an entire temperature range in which the fastener will be exposed, with high fracture toughness, minimal notch sensitivity, low catalycity, high thermal emissivity, high stiffness, high hardness, good thermal shock resistance and not scaling by hot atomic oxygen. Ceramics including alumina are naturally low in catalycity, the opposite of most metals. The silicon-carbide crystal whiskers with aluminum oxide not only improve fracture toughness, but also increase the fastener's emissivity. Again the opposite of metal which have very low emissivity. The aluminum oxide ceramic material reinforced with the silicon-carbide crystal whiskers also has a coefficient of thermal expansion that closely matches the coefficient of thermal expansion of oxide ceramic matrix components with which the fastener is used.

In constructing the fastener bolt, a mixture of the aluminum oxide ceramic material powder and the silicon-carbide crystal whiskers is prepared. The mixture is then hot pressed at a high temperature and high pressure, forming a blank having a head and a shaft.

The aluminum oxide ceramic material and reinforcing silicon-carbide crystal whiskers produce a blank of hard ceramic material with high fracture toughness that can be machined. A tool interface surface, for example a hex head is machined on the head of the blank. A screw thread exterior surface is machined on the shaft of the blank. In the valley of the threads, the threads are not cut to ASTM standards, but instead are cut so that the valleys are shallow, reducing chance of crack initiation and notch sensitivity.

In constructing the fastener nut, in a similar manner to that of the fastener bolt, a mixture of the aluminum oxide ceramic material powder reinforced with the silicon-carbide crystal whiskers is prepared. The mixture is then hot pressed. To form the internal screw threads in the nut, a graphite pre-form is machined with external screw threads that are complementary to the internal screw threads of the nut. The pre-form is placed inside the powder mixture so that during compaction and heating of the mixture into a dense finished ceramic blank, the internal threads of the nut are formed around the graphite pre-form. After the hot pressing of the mixture forming the blank is completed, the much softer graphite pre-form is cleaned out of the blank leaving internal female screw threads in the fastener nut to exact dimensions since the threads were formed under pressure during sintering, eliminating shrinkage normally associated with firing ceramics. The outside configuration of the fastener nut can then be machined to the desired configuration.

Unlike TPS applications, turbine engine components are run for long periods of time and are usually actively cooled, to allow material to survive the harsh environment. While ceramic fasteners can take higher temperatures than metals in some cases, the ceramic fastener needs to be cooled. Especially since the thermal conductivity of most ceramics and ceramic matrix composite components have fairly poor thermal conductivity compared to metals. In a similar manner to constructing the nut, pre-forms can be used in constructing the fastener bolt with internal cooling channels, internal screw threading and/or internal tool interface surfaces such as an allen wrench or a Torx interface surface that would be very expensive if not impossible to machine.

The features, functions, and advantages that have been discussed can be achieved independently in various embodiments or may be combined in yet other embodiments, further details of which can be seen with reference to the following description and drawings.

DESCRIPTION

Figure 1:
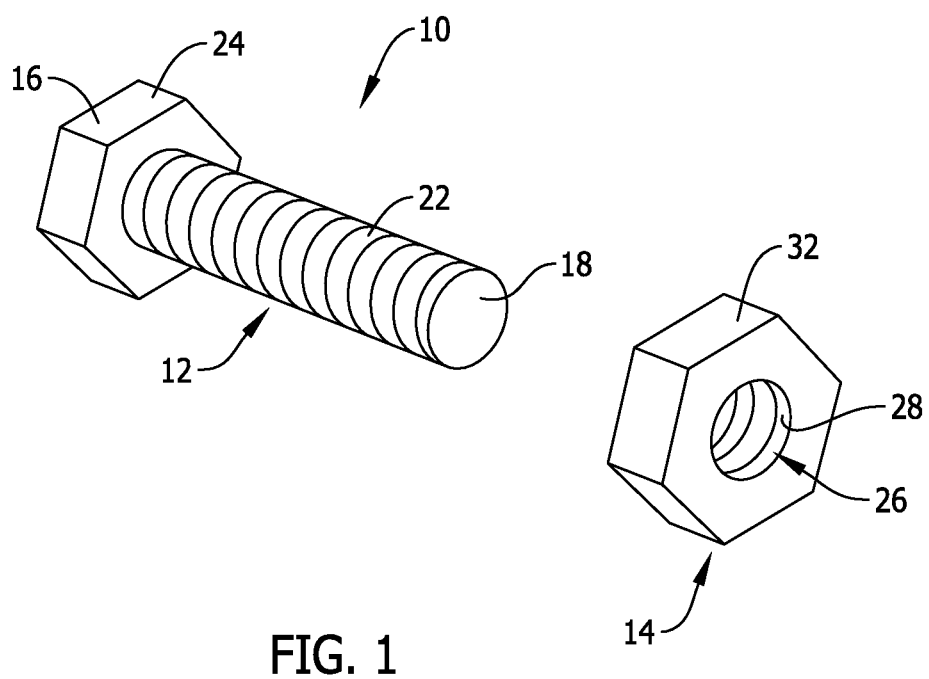
FIG. 1 is a representation of a perspective view of the fastener bolt and nut of this disclosure.
Figure 2:
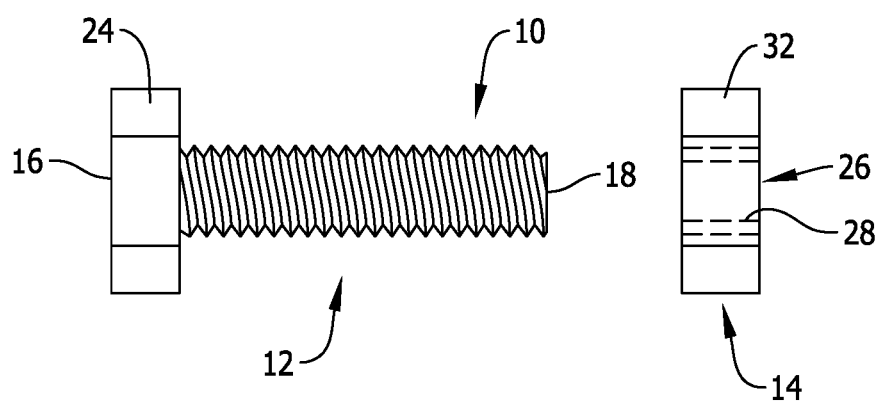
FIG. 2 is a representation of a side elevation view of the fastener bolt and nut of this disclosure.

FIG. 1 is a representation of a perspective view of the fastener 10 of this disclosure which is comprised of a bolt 12 or the bolt and a nut 14. FIG. 2 is a side elevation view of the bolt 12 and nut 14. In FIG. 2, the opposite side of the bolt 12 and nut 14 is a mirror image of the side view of the bolt 12 and nut 14 represented in FIG. 2. As represented in FIGS. 1 and 2, the configurations of the bolt 12 and nut 14 are conventional.

The bolt 12 is shown with a head 16 and a shaft 18 with a screw threaded exterior surface 22. The bolt head 16 is shown having a hex-shaped tool interface surface 24. The hex-shaped configuration of the bolt head tool interface surface 24 is only one example of the tool interface surface configuration the bolt head 16 could have. The bolt head 16 could be constructed with any other equivalent tool interface surface configuration.

The fastener nut 14 has a cylindrical interior bore 26 with a screw threaded interior surface 28 surrounding the interior bore 26, The screw threaded interior surface 28 is formed complementary to the screw threaded exterior surface 22 of the bolt 12, enabling the nut 14 to be screw threaded on the bolt 12. The nut 14 is also formed with a hex-shaped tool interface surface 32 on the exterior of the nut. As with the fastener bolt 12, the fastener nut 14 could be constructed with any other equivalent tool interface surface configuration.

As stated earlier, the configurations of the fastener bolt 12 and the fastener nut 14 are conventional. What makes the fastener bolt 12 and fastener nut 14 unique is that they are constructed as a high temperature threaded fastener. This is achieved by both the bolt 12 and nut 14 being constructed of a ceramic composite that uses the technology of whisker reinforcement. The hard ceramic matrix is reinforced with extremely strong, stiff, silicon-carbide crystals, commonly called whiskers. Both the bolt 12 and nut 14 are constructed of a ceramic matrix composite material that is a mixture of aluminum oxide ceramic material reinforced with silicon carbide crystal whiskers. One example of a ceramic matrix composite material used to construct the bolt 12 and nut 14 is the whisker reinforced ceramic material WG-300®, which is a registered trademark of Greenleaf Corporation. In WG-300®, the percentage of silicon-carbide crystal whiskers in the mixture of aluminum oxide ceramic material powder and the silicone carbine crystal whiskers is approximately 30%. In other examples of the ceramic composite material used to construct the bolt 12 and nut 14, the percentage of silicon-carbide crystal whiskers in the mixture of aluminum oxide ceramic material powder and the silicon-carbide crystal whiskers is in a range of 10%-30% of the mixture.

Figure 3:
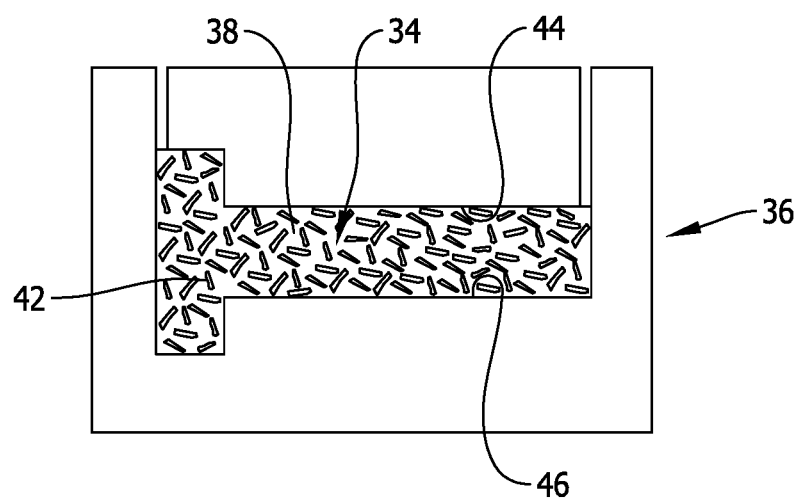
FIG. 3 is a representation of a method of constructing the fastener bolt of this disclosure.
Figure 4:
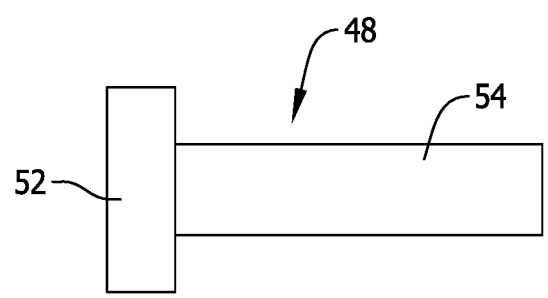
FIG. 4 is a representation of a blank formed in constructing the fastener bolt.

The method of constructing the high temperature threaded fastener bolt 12 is represented in FIG. 3. In the construction of the bolt 12, a mixture 34 of the aluminum oxide ceramic material powder and the silicone-carbide crystal whiskers is prepared. The mixture 34 of the aluminum oxide ceramic material powder and the silicon-carbide crystal whiskers is put into a high temperature press 36 for forming a blank to be used in constructing the fastener bolt 12. FIG. 3 shows a representation of a high temperature high pressure press 36. In FIG. 3 the aluminum oxide ceramic material powder 38 and the silicon-carbide crystal whiskers 42 are represented schematically and are not shown to scale. The press 36 has mold die pieces 44, 46 that are configured to form a blank for the bolt 12 from the aluminum oxide ceramic material powder and the silicon-carbide crystal whiskers of the mixture 34. The mixture 34 is positioned in the press 36 between the press dies 44, 46 and is hot pressed at a high temperature (over 3,000 degrees Farenheit) and compressed at a high pressure, forming a blank 48 of the bolt 12 having a head 52 and a shaft 54 as represented in FIG. 4. The blank 48 is dense and has a fine grain size. The external pressure applied to the mixture 34 simultaneously with the temperature of the press 36 produces good consolidation of the aluminum oxide ceramic material and the reinforcing silicone-carbide crystal whiskers.

The aluminum oxide ceramic material and the reinforcing silicon-carbide crystal whiskers 54 produce the blank 48 of hard ceramic material with high fracture toughness that can be machined.

A tool interface surface, for example the hex-shaped bolt head 24 represented in FIGS. 1 and 2 is then machined on the head 52 of the blank 48. Alternatively, the tool interface surface 24 could be molded on the blank head 52. A screw threaded exterior surface 22, for example that represented in FIGS. 1 and 2 is machined on the shaft 54 of the blank 48. The screw threaded exterior surface 22 is machined on the shaft 54 of the blank 48 with the bottoms of the valleys of the screw threads being made shallow to further reduce the notch sensitivity of the fastener 10 under load. The whiskers 42 in the blank 48 help keep microcracks from forming and propagating through the shaft 54 of the blank 48 during machining of the blank. The whiskers 42 in the bolt 12 also make the screw threads 22 machined on the bolt 12 much less notch sensitive. The whiskers 42 also help keep microcracks from forming and propagating through the fastener 10 under load in use of the fastener.

Figure 5:
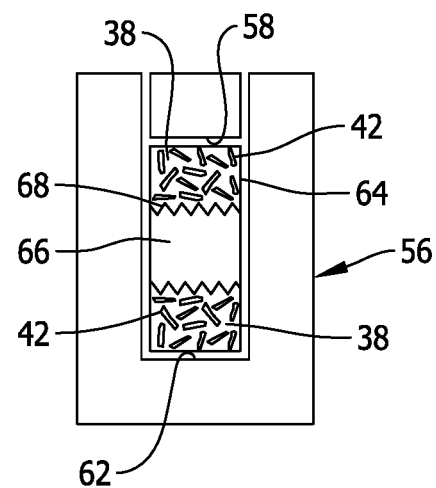
FIG. 5 is a representation of a method of constructing the fastener nut of this disclosure.

The method of constructing the fastener nut 14 is similar to that of the fastener bolt 12 and is represented in FIG. 5. In the construction of the nut 14, the mixture 34 of the aluminum oxide ceramic material powder 38 and the silicon-carbide crystal whiskers 42 is prepared. The mixture 34 of the aluminum oxide ceramic material powder 38 and the silicon-carbide crystal whiskers 42 is put into a high temperature press 56 for forming a blank to be used in constructing the fastener nut 14. FIG. 5 shows a representation of a high temperature high-pressure press 56. In FIG. 5 the aluminum oxide ceramic material powder 38 and the silicon-carbide crystal whiskers 42 are represented schematically and are not shown to scale. The press 56 and has mold die pieces 58, 62 that are configured to form a blank for the nut 14 from the aluminum oxide ceramic material powder and the silicon-carbide crystal whiskers of the mixture 34. The mixture 34 is positioned in the press 56 between the press die pieces 58, 62 and is hot pressed at a temperature of over 3000° Fahrenheit while the mixture is compressed at a high pressure to form a blank of the nut 14. The blank 64 of the nut 14 is dense and has a fine grain size. External pressure applied to the mixture 34 simultaneously with the temperature of the press 56 produces a good consolidation of the aluminum oxide ceramic material and the reinforcing silicon-carbide crystal whiskers. The aluminum oxide ceramic material and the reinforcing silicon-carbide crystal whiskers produce the blank 64 of the nut 14 of hard ceramic material with high fracture toughness.

In developing the method of forming internal screw threads in the blank 64 of the nut 14, it was recognized that it would be very difficult, if possible to machine internal screw threads in the very hard ceramic material of the nut blank 64, at least cost efficiently. To form the screw threaded interior surface 28 in the nut 14, a graphite preform 66 is machined with external screw threads 68 that are complementary to the screw threaded interior surface 28 of the nut 14. As represented in FIG. 5, the preform 66 is placed inside the mixture 34 in the press 56. During heating and compression of the mixture 34 in the press 56 into the dense, finished ceramic blank 64 of the nut 14, the screw threaded interior surface 28 of the nut 14 is formed around the graphite preform 66. After the hot pressing of the mixture 34 forming the nut blank 64 is completed, the soft graphite preform 66 having the external screw thread 68 is easily cleaned out of the nut blank 64, leaving a cost-efficient, clean, precise screw threaded interior surface 28 in the nut blank 64. Because the screw threaded interior surface 28 is formed during the pressure sintering around the preform 66, no shrinkage of the screw threaded interior surface 28 occurs. This enables the production of a high tolerance screw threaded interior surface 28 that matches closely to the machined screw threaded exterior surface 22 on the mating fastener bolt 12.

As an alternative to using the mixture of aluminum oxide ceramic material powder and silicon-carbide whiskers in constructing the bolt 12 and nut 14, silicon nitride ($Si_3N_4$) could be used in their place.

A tool interface surface, for example the hex shaped exterior surface 32 of the nut 14 is then machined on the nut 14. Alternatively, the tool interface surface 32 could be molded on the nut blank 64.

Figure 6:
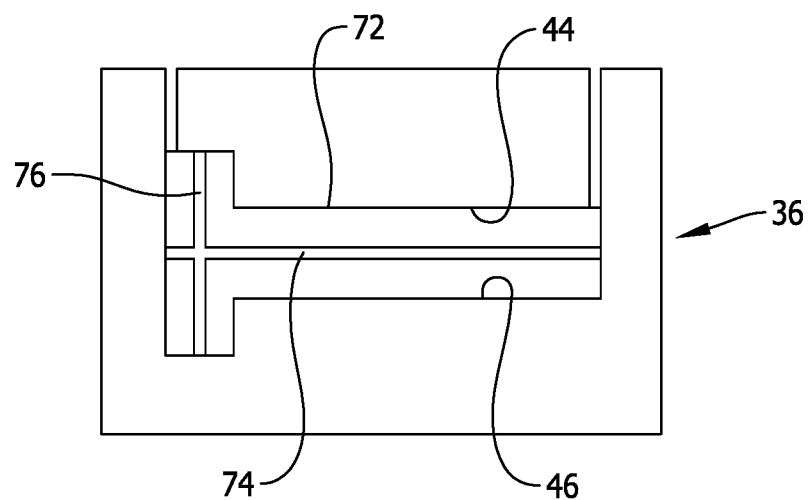
FIG. 6 is a representation of a method of forming cooling channels, internal screw threads, and/or internal tool interface surfaces in the fastener bolt of this disclosure.
Figure 7:
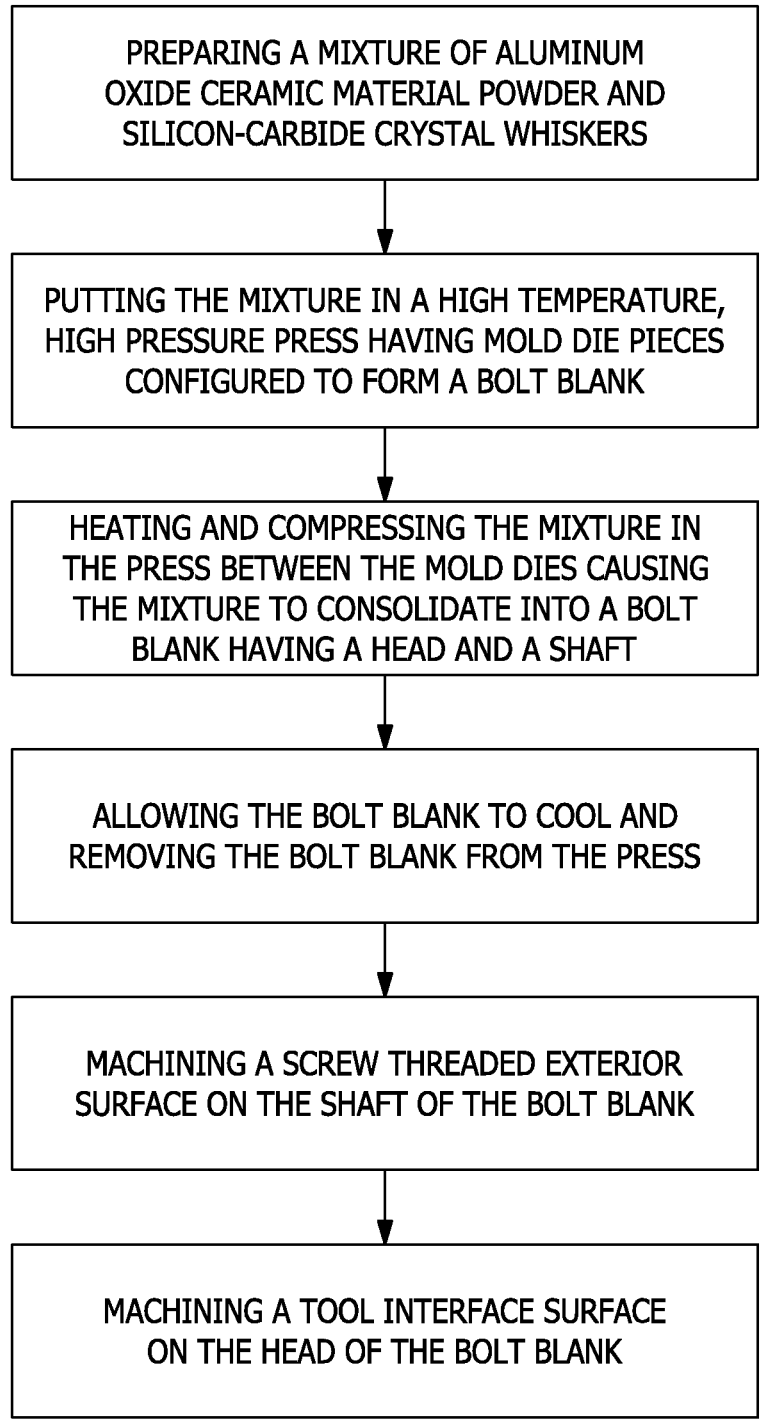
FIG. 7 is a representation of a flow chart of the method steps of forming the fastener bolt of this disclosure.
Figure 8:
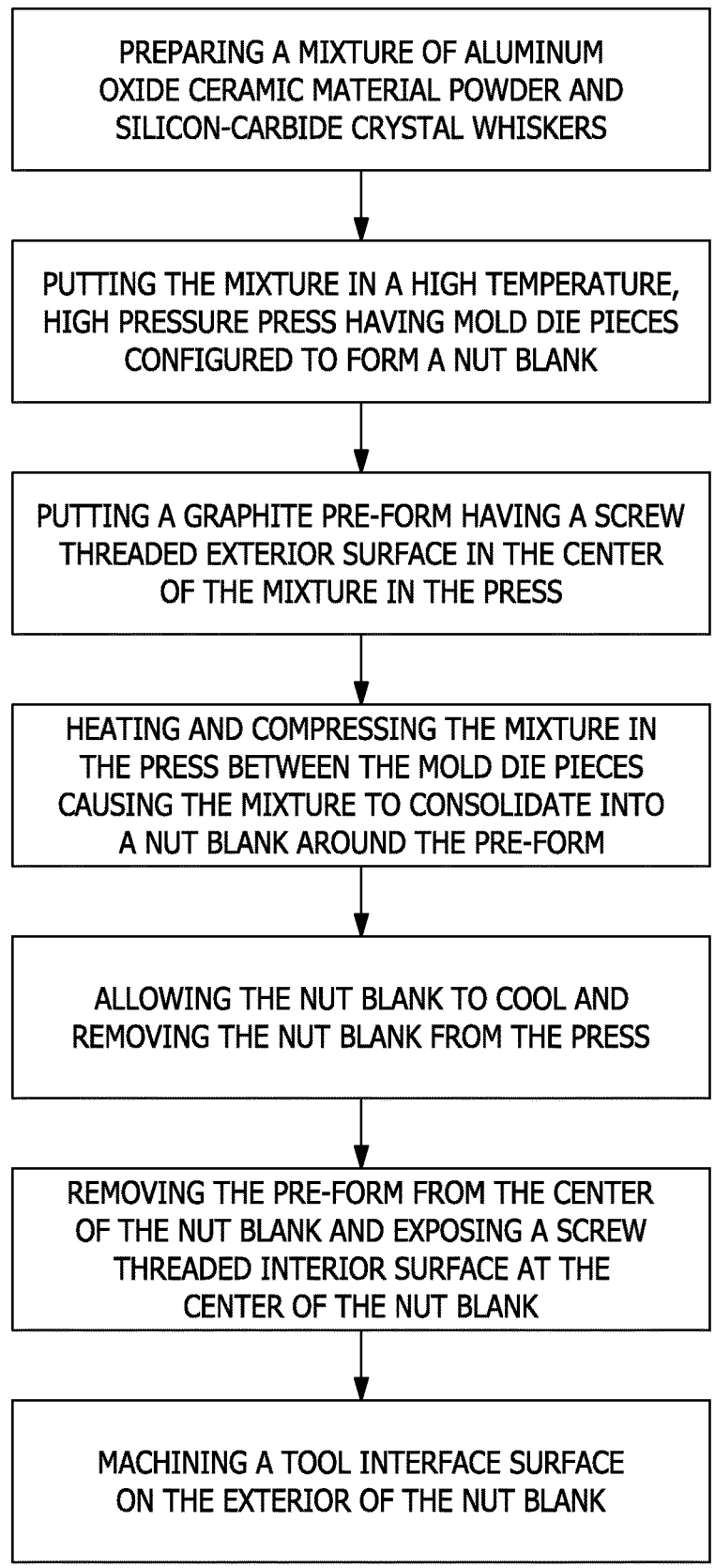
FIG. 8 is a representation of a flow chart of the method steps of forming the fastener nut of this disclosure.

FIG. 6 is a representation of a method of constructing the high temperature threaded fastener bolt 72 with cooling channels and/or internal tool interface surfaces. In the method of construction represented in FIG. 6, the fastener bolt 72 is constructed in the same manner as the fastener bolt 12 described earlier. However, when the mixture 34 of the aluminum oxide ceramic material powder and silicon-carbide crystal whiskers is put into the high temperature press 36, one or more graphite preforms 74, 76 are positioned in the mixture 34.

One of the preforms 74 represented in FIG. 6 is positioned at the center of the mixture 34 in press 36 along the length of the bolt 72 to be formed. This preform 74 could have a cylindrical exterior configuration to form a cylindrical cooling channel through the center of the fastener bolt 72. Alternatively, or in addition to forming a cooling channel, the preform 74 at the center of the mixture 34 could have a configuration to form an internal tooling surface in the fastener bolt 72, for example a hexagon cross-section to form a hexagonal internal tool interface surface in the fastener bolt 72. The preform 74 with the hexagon cross-section would form an internal tool interface surface having a hexagonal configuration that could be engaged by an allen wrench.

In addition to the preform 74 are positioned in the mixture 34 along the length of the bolt 12 to be formed, a further preform 76 could be positioned in the mixture 34 across the width of the bolt 72 to be formed. As represented in FIG. 6, the additional preform 76 is positioned in the portion of the mixture 34 that will be formed as the head of the fastener bolt 72. This additional preform 76 could have a cylindrical exterior surface configuration to form a cylindrical cooling channel that passes through the center of the head of the fastener bolt 72.

The press 36 is operated to heat and compress the mixture 34 in the press to form the fastener bolt 72 in the same manner as described earlier. Once the blank for the fastener bolt 72 is formed and removed from the press 36, the graphite preforms 74, 76 can be removed from the blank in the same manner discussed earlier with regard to the fastener nut 14. This produces the fastener bolt 72 with internal cooling channels in the fastener bolt and/or an interior tool interface surface in the fastener bolt.

Fastener bolts and fastener nuts made out of Greenleaf WG-300 with 30% SiC whisker reinforced alumina has a coefficient of thermal expansion (CTE) of $6.0 \times 10^{-6}$ and WG-150 with 18% SiC whisker reinforcement has a CTE of $7.0 \times 10^{-6}$. These fastener has a close CTE match to the oxide CMC using Nextel-720 fiber reinforcement which has an in-plane CTE is $6.56\times10^{-6}$/C or the oxide CMC with the Nextel-610 fiber has an in-plane CTE of $7.87\times10^{-6}$/C.

As an alternative to using the mixture of aluminum oxide ceramic material powder and silicon-carbide crystal whiskers in construction of the bolt and nut fasteners, silicon nitride ($Si_3N_4$) could be used in their place. While SiC whisker reinforced alumina has a preferred higher fracture toughness of 10 MPa$\sqrt{m}$ compared to 6-7 MPa$\sqrt{m}$ for $Si_3N_4$ components the CTE is much lower $3.0$-$3.8\times10^{-6}$/C which it would make it ideal to be used with non-oxide CMC like C/SiC and SiC/SiC which also has a low CTE in the range of $3.0$-$5\times10^{-6}$/C. While the lower fracture toughness of Si3N4 makes it more challenging to fabricate these shapes it still should work for a number of applications.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

What is claimed:

1. A method of making a fastener comprising:
creating a mixture of aluminum oxide ceramic material powder and silicon-carbide whiskers;
hot pressing the mixture of aluminum oxide ceramic material powder and silicon-carbide whiskers at a high temperature and a high pressure creating a solid blank of hard ceramic material;
forming a screw threaded surface on the solid blank of hard ceramic material;
inserting a pre-form with external screw threads inside the mixture of aluminum oxide ceramic material powder and silicon-carbide whiskers prior to hot pressing the mixture of aluminum oxide ceramic material powder and silicon-carbide whiskers at the high temperature and the high pressure creating the solid blank of hard ceramic material; and,
forming the screw threaded surface on the solid blank of hard ceramic material by cleaning the pre-form out of the solid blank of hard ceramic material leaving internal screw threads in the solid blank of hard ceramic material.

2. The method of claim 1, further comprising:
creating the mixture of aluminum oxide ceramic material powder and silicon-carbide crystal whiskers with a percentage of silicon-carbide crystal whiskers in the mixture being in a range of 18% to 30% of the mixture.

3. The method of claim 1, further comprising:
creating the solid blank of hard ceramic material with a head and a shaft.

4. The method of claim 3, further comprising:
machining a tool interface surface on the head of the solid blank of hard ceramic material.

5. The method of claim 3, further comprising:
machining a screw threaded exterior surface on the shaft of the solid blank of hard ceramic material.

6. The method of claim 5, further comprising:
machining the screw threaded exterior surface with shallow valleys reducing a potential for crack initiation and reducing notch sensitivity.

7. A method of making a fastener comprising:
creating a mixture of aluminum oxide ceramic material powder and silicon-carbide whiskers;
hot pressing the mixture of aluminum oxide ceramic material powder and silicon-carbide whiskers at a high temperature and a high pressure creating a solid blank of hard ceramic material;
forming a screw threaded surface on the solid blank of hard ceramic material;
inserting a pre-form inside the mixture of aluminum oxide ceramic material powder and silicon-carbide whiskers prior to hot pressing the mixture of aluminum oxide ceramic material powder and silicon-carbide whiskers at the high temperature and the high pressure creating the solid blank of hard ceramic material; and,
forming a cooling channel through the solid blank of hard ceramic material by cleaning the pre-form out of the solid blank of hard ceramic material leaving the cooling channel in the solid blank of hard ceramic material.

8. The method of claim 7, further comprising:
creating the solid blank of hard ceramic material with a head and a shaft.

9. The method of claim 8, further comprising:
machining a tool interface surface on the head of the solid blank of hard ceramic material.

10. The method of claim 8, further comprising:
machining a screw threaded exterior surface on the shaft of the solid blank of hard ceramic material.

11. The method of claim 10, further comprising:
machining the screw threaded exterior surface with shallow valleys reducing a potential for crack initiation and reducing notch sensitivity.

12. A method of making a fastener comprising:
creating a mixture of aluminum oxide ceramic material powder and silicon-carbide whiskers;
hot pressing the mixture of aluminum oxide ceramic material powder and silicon-carbide whiskers at a high temperature and a high pressure creating a solid blank of hard ceramic material;
forming a screw threaded surface on the solid blank of hard ceramic material;
inserting a pre-form inside the mixture of aluminum oxide ceramic material powder and silicon-carbide whiskers prior to hot pressing the mixture of aluminum oxide ceramic material powder and silicon-carbide whiskers at the high temperature and the high pressure creating the solid blank of hard ceramic material; and,
forming an internal tool interface surface in the solid blank of hard ceramic material by cleaning the pre-form out of the solid blank of hard ceramic material leaving the internal tool interface surface in the solid blank of hard ceramic material.

13. The method of claim 12, further comprising:
creating the solid blank of hard ceramic material with a head and a shaft.

14. The method of claim 13, further comprising:
machining a tool interface surface on the head of the solid blank of hard ceramic material.

15. The method of claim 13, further comprising:
machining a screw threaded exterior surface on the shaft of the solid blank of hard ceramic material.

16. The method of claim 15, further comprising:
machining the screw threaded exterior surface with shallow valleys reducing a potential for crack initiation and reducing notch sensitivity.

17. A method of making a fastener comprising:
creating a first mixture of aluminum oxide ceramic material powder and silicon-carbide whiskers;

hot pressing the first mixture of aluminum oxide ceramic material powder and silico-carbide whiskers at a high temperature and a high pressure creating a solid first blank of hard ceramic material;

machining a screw threaded exterior surface on the solid first blank of hard ceramic material;

creating a second mixture of aluminum oxide ceramic material powder and silicon-carbide whiskers;

inserting a pre-form with external screw threads into the second mixture of aluminum oxide ceramic material powder and silicon-carbide whiskers;

hot pressing the second mixture of aluminum oxide ceramic material powder and silicon-carbide whiskers at the high temperature and the high pressure creating a solid second blank of hard ceramic material; and, forming an internal screw threaded surface in the solid second blank of hard ceramic material by cleaning the pre-form out of the solid second blank of hard ceramic material leaving internal screw threads in the solid second blank of hard ceramic material.

18. The method of claim 17, further comprising:
machining a tool interface surface on the solid second blank of hard ceramic material.

19. The method of claim 17, further comprising:
machining the screw threaded exterior surface on the solid first blank of hard ceramic material with shallow valleys reducing a potential for crack initiation and reducing notch sensitivity.

20. The method of claim 17, further comprising:
creating the first mixture of aluminum oxide ceramic material powder and silicon-carbide crystal whiskers with a percentage of silicon-carbide crystal whiskers in the first mixture being in a range of 18% to 30% of the mixture.

* * * * *